May 18, 1943.　　R. A. NORTON　　2,319,255
GROUND WORKING DEVICE
Filed July 20, 1939　　　4 Sheets-Sheet 1
FIG. 1.
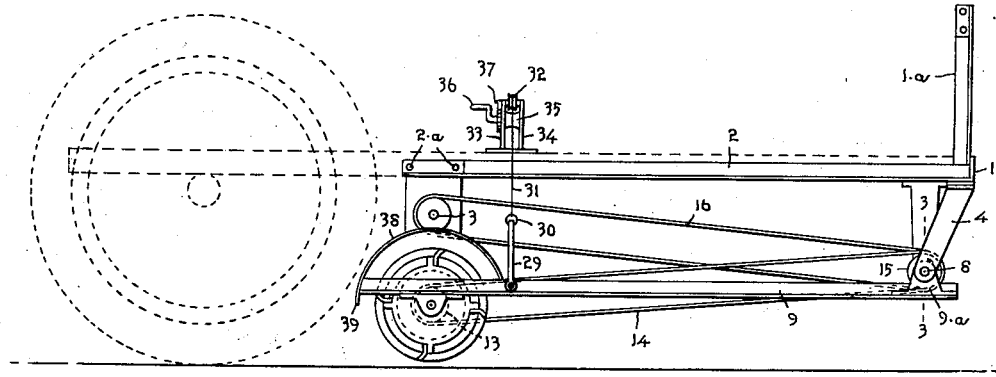
FIG. 2.　　　FIG. 3.
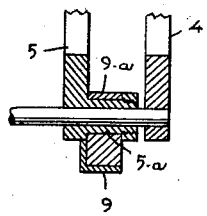
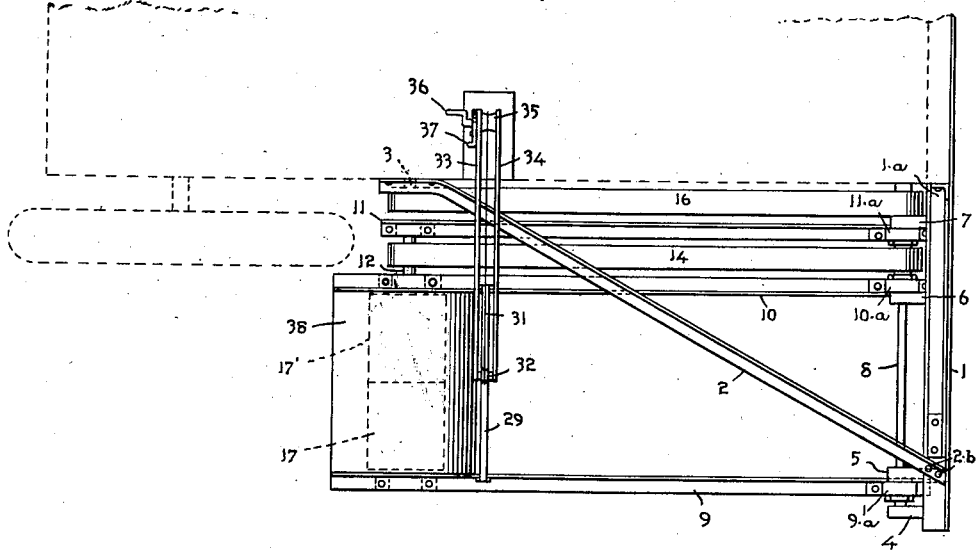
Rolland A. Norton, Inventor
By Ogle R. Singleton
Attorney May 18, 1943. R. A. NORTON 2,319,255
GROUND WORKING DEVICE
Filed July 20, 1939 4 Sheets-Sheet 2

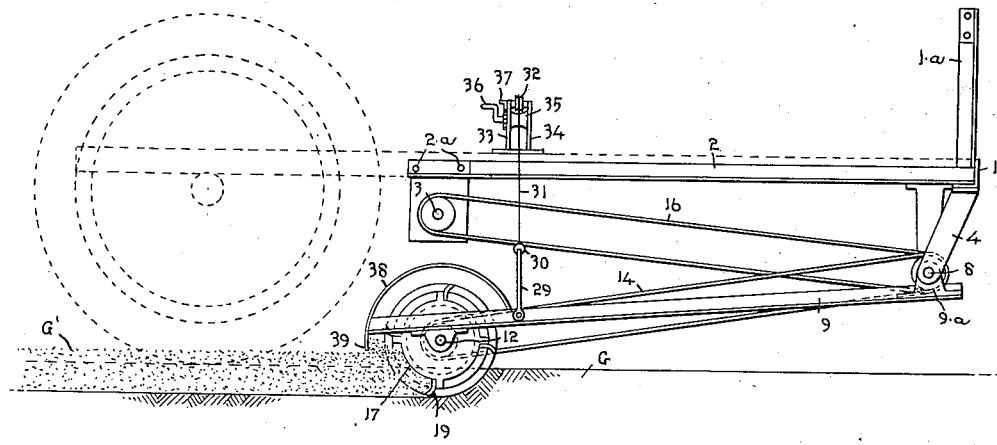
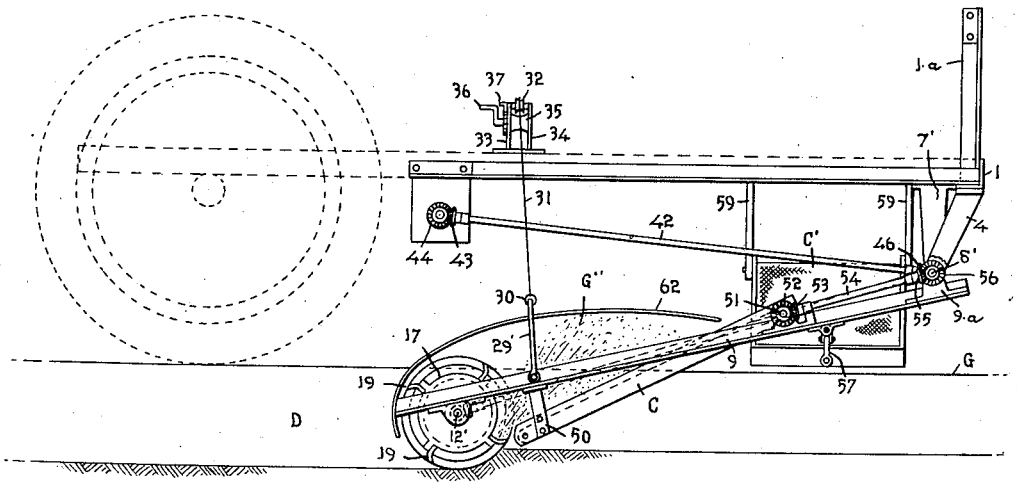

May 18, 1943. R. A. NORTON 2,319,255
GROUND WORKING DEVICE
Filed July 20, 1939 4 Sheets-Sheet 4
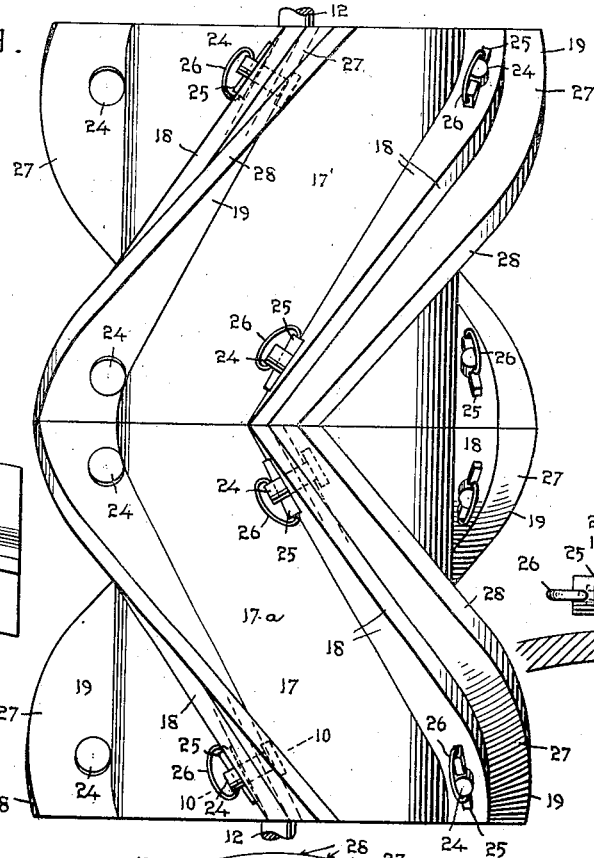
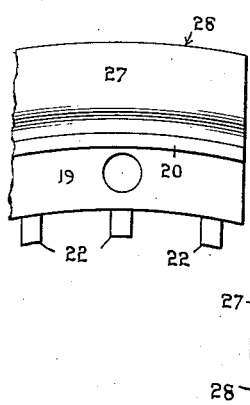
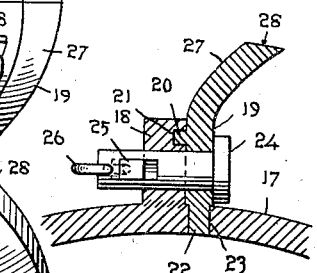
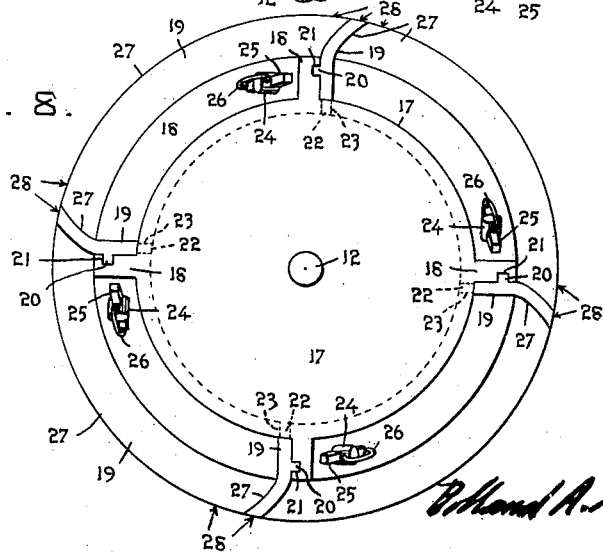

Patented May 18, 1943

2,319,255

UNITED STATES PATENT OFFICE 2,319,255

GROUND WORKING DEVICE

Rolland A. Norton, Norfolk, Va.

Application July 20, 1939, Serial No. 285,603

5 Claims. (Cl. 97—40)

My invention consists in a new and useful improvement in ground working devices and is designed to provide a device which can be used alternatively as a plow and a ditcher, and can be mounted upon any one of the ordinary types of tractors used in agricultural operations. The particularly novel and useful features of my device are the rotary cutter member which comprises a pair of drums, each provided with a novel arrangement of series of cutter bars, a pivotally mounted frame for the cutter member and means for driving the cutter member and means for adjusting the pivotally mounted frame. As will more fully appear from the detailed description of the details of construction and operation of my device, the valuable advantage of my invention resides in the peculiar combination, which I have devised, of a plow and ditching device. The parts are so designed that the frame and its driving and adjusting means can be used with the cutter member comprising two drums for the plowing operation, and by extremely simple and practical modifications the same frame and its driving and adjusting means can be used with the cutter member comprising a single drum for the ditching operation.

While I have illustrated in the drawings filed herewith and have hereinafter fully described certain embodiments of my invention, it is to be distinctly understood that I do not consider my invention limited to said specific embodiments, but refer for its scope to the claims appended hereto.

In the drawings:

Fig. 1 is a side elevation of my device in normal inoperative position, the parts being so related that the device is adapted for plowing.

Fig. 2 is a top plan view of the device, the parts being as shown in Fig. 1.

Fig. 3 is a vertical section on the line 3—3 of Fig. 1.

Fig. 6 is a side elevation of the device, the parts being as shown in Figs. 1 and 2, and device operating as a plow.

Fig. 7 is a side elevation of the device, the parts being as shown in Figs. 4 and 5, and the device operating as a ditcher.

Fig. 8 is an enlarged end view of the cutting drum.

Fig. 9 is an enlarged plan view of the cutting drums.

Fig. 10 is a vertical section on the line 10—10 of Fig. 9.

Fig. 11 is a fragmentary side elevation of one of the cutter bars.

Figure 4:
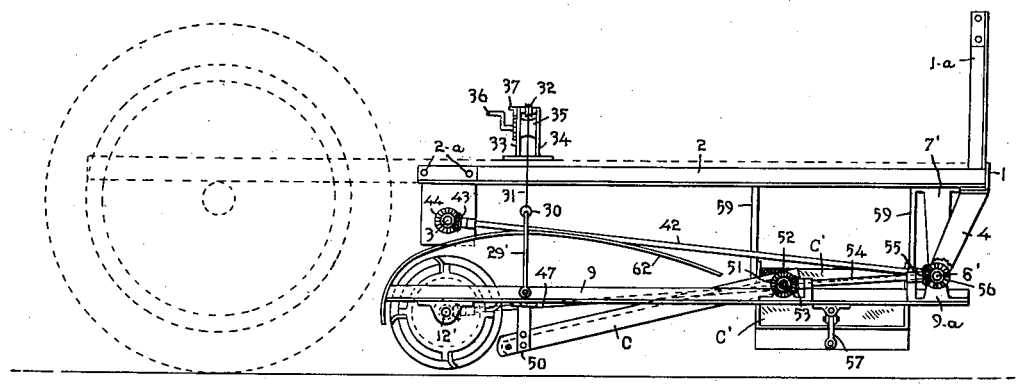
Fig. 4 is a side elevation of my device in normal inoperative position, the parts being so related that the device is adapted for ditching.

As illustrated in the drawings, my device has a frame of beams and braces consisting of angle irons, of which the forward beam 1 is attached by suitable fastening means such as bolts (not shown) to the forward end of a tractor indicated in dotted lines, so as to extend laterally therefrom, and has the brace 1—a with its inner end attached to the tractor and its outer end to the outer end of the beam 1. The diagonally disposed brace 2 is suitably attached by bolts 2—a to the side of the tractor adjacent the tractor power pulley 3 (as illustrated in Figs. 1 and 2) and by bolts 2—b to the outer end of the beam 1. From the outer end of the beam 1 there depends a bracket 4, and at suitable points along the beam 1 there are provided the depending brackets 5, 6 and 7 having hollow trunnions, such as 5—a (Fig. 3). The bracket 5 is removably attached to beam 1 by bolts, to be adjustable therealong, for a purpose to be presently explained. Journaled in the bracket 4 and the hollow trunnions of the brackets 5, 6 and 7 is the shaft 8. I provide the pivotally mounted arms 9, 10 and 11, having collars 9—a, 10—a and 11—a respectively, carried by the trunnions of brackets 5, 6 and 7 respectively. Journaled in the outer ends of the arms 9, 10 and 11 is the shaft 12 having a pulley 13 connected by belt 14 with pulley 15 on shaft 8. The shaft 8 has a suitable pulley connected by belt 16 with the tractor power pulley 3.

Suitably mounted on the shaft 12 is the cutter member which consists of two cylindrical drums 17 and 17'. Formed integral with each of the drums 17 and 17' are four peripheral spiral flanges 18 so extended between the outer and inner edges of the circumferential face 17—a of each of the drums 17 and 17', that each of the flanges 18 embraces a quadrant of said face 17—a. Each flange 18 has mounted thereon a spiral cutter bar 19 having the key 20 received in the key-way 21 in the flange 18, and a series of lugs 22 received in orifices 23 in the face 17—a. Each bar 19 is locked to its flange 18 by a pair of bolts 24 transfixing bar 19 and flange 18. Each bolt 24 is so slotted as to receive therethrough the locking wedge 25 bearing against the flange 18, and urged to wedging action by the spring detent 26 bearing on the bolt 24 and head of wedge 25. The bars 19 are formed with arcuate cutting heads 27 everted from the flanges 18, with outer surfaces 28 concentric with the circumferential face 17—a. It is to be particularly noted that when the device is to be used for plowing (Figs. 1, 2 and 6), the drums 17 and 17' are disposed on the shaft 12 in the relation indicated in Fig. 9, that is to say the drums 17 and 17' are so related that the inner ends of the series of flanges 18 and their cutter bars 19 on each drum register precisely with those on the other drum, the spiral curvature of the flanges 18 and cutter bars 19 of each drum being reverse to those on the other drum, thereby producing a cutting member having four V-shaped cutter blades symmetrically disposed about the periphery of the member.

The pivotally mounted arms 9 and 10 are supported by a bail 29 passed through a ring 30 on cable 31 rove over pulley 32 journaled between arms 33 and 34 forming a winch mounted on the tractor and having drum 35 for cable 31, with crank 36 and detent 37.

Suitably mounted on arms 9 and 10 is the arcuate breaker plate 38 disposed over the drums 17 and 17' and having its rear end 39 extending somewhat below arms 9 and 10.

Figure 5:
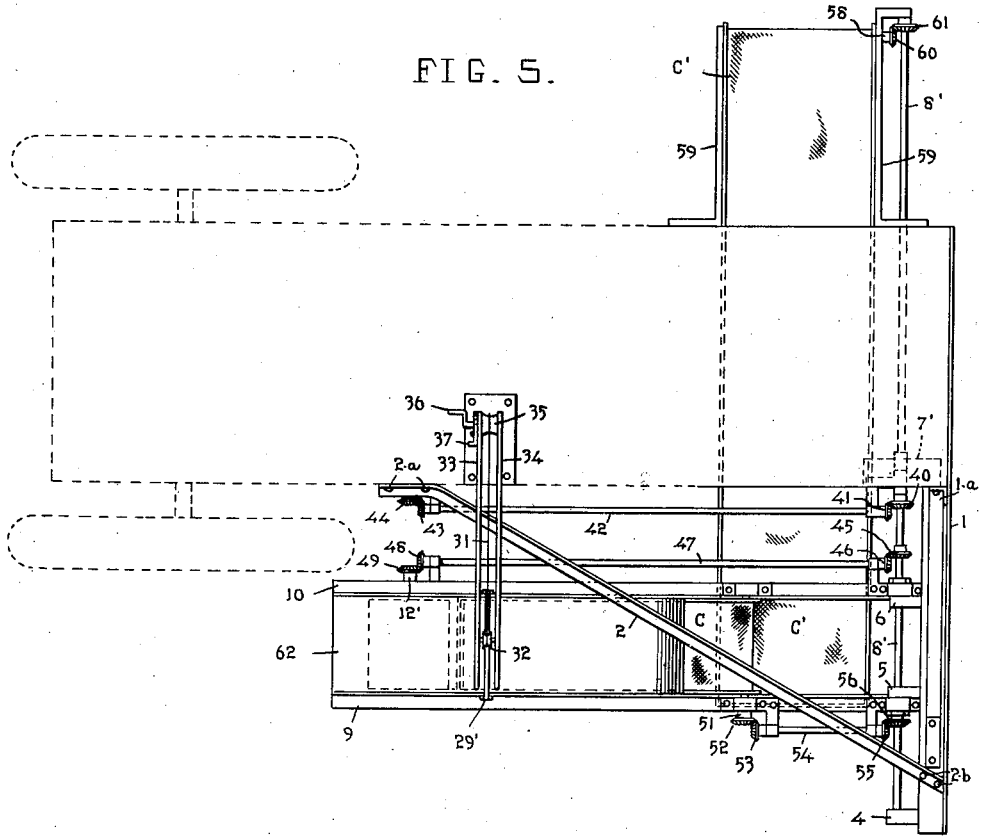
Fig. 5 is a top plan view of the device, the parts being as shown in Fig. 4.

I will now describe the details of construction of my device when it is modified for use as a ditcher, as illustrated in Figs. 4, 5 and 7, a modified form of driving mechanism being also illustrated in said figures. For the ditching operation, only the single drum 17 is used and it is mounted between arms 9 and 10 on shaft 12', the arm 9 being shifted toward arm 10 by readjusting bracket 5 on beam 1 (Fig. 5). It is to be noted that the drum 17 is reversed from its position when used in plowing, as indicated in Figs. 4 and 7. A shaft 8' is journaled in brackets 4, 5, 6 and 7, and has a pinion 40 meshing with a pinion 41 on a shaft 42 suitably journaled on the side of the tractor and having a pinion 43 meshing with drive pinion 44 of the tractor. The shaft 8' has a pinion 45 meshing with pinion 46 on a shaft 47 suitably journaled on arm 10 and having pinion 48 meshing with pinion 49 on the shaft 12' carrying the drum 17. The foregoing described shafts and pinions illustrate a modified form of driving means for my device. In order to remove the material excavated by the drum 17, I provide the two conveyors C and C'. The conveyor C depends from the arms 9 and 10 by hangers 50 so that its receiving end is immediately adjacent the drum 17 and its discharge end is carried by a drive pulley on a shaft 51 suitably journaled on the arms 9 and 10 and having a pinion 52 meshing with pinion 53 on a shaft 54 suitably journaled on the arm 9 and having a pinion 55 meshing with pinion 56 on the shaft 8'. The conveyor C' has its receiving end disposed below the discharge end of the conveyor C, carried by a pivotally mounted hanger 57 depending from the arm 9, and its discharge end carried by a drive pulley on shaft 58 suitably journaled in brackets 59 depending from the tractor and having a pinion 60 meshing with pinion 61 on the shaft 8'. For vertical adjustment of the arms 9 and 10, when related as illustrated in Fig. 5, I substituted the bail 29' in ring 30 of the hoist. When my device is used as a ditcher, I substitute for the breaker plate 38 the modified plate 62 which extends forwardly over a considerable portion of the conveyor C.

Having described the details of construction of my device, I will now describe its operation for plowing. The parts being disposed, as illustrated in Figs. 1 and 2, the device is transported by the tractor to the point where the plowing is to be begun. The operator then adjusts the pivotally mounted frame carrying the drums 17 and 17', to produce the desired depth of cut, by manipulation of the winch. He then applies power from the drive shaft of the tractor, through the driving means of the device to cause the drums 17 and 17' to revolve. It is to be noted (Fig. 6) that the direction of rotation of the drums 17 and 17' is such that the cutter bars 19 are caused to travel through the ground G being worked in a direction opposite to the direction of travel of the tractor propelling my device, and that the arcuate cutter heads 27 of the cutter bars 19 are projected in the direction of rotation of the drums 17 and 17', and it is to be particularly noted that by reason of the configuration and disposition of the cutter bars 19 they produce a shearing action upon the ground G, and also that by reason of the peculiar disposition of the faces 28 of the arcuate heads 27 of the cutter bars 19, the abrasive action upon them incident to contact with the ground G produces self-honing action on the cutter bars 19. Also it is to be noted (Fig. 6) that the rear end 39 of the breaker-plate 38 acts as a leveling means upon the worked ground G'. It is obvious that the plate 38 can be adjustably mounted so that the position of this end 39 may be disposed in the desired relation to the cutter member.

I will now describe the operation of my device for ditching. The parts being disposed as illustrated in Figs. 4 and 5, the device is transported by the tractor to the point where the ditching is to be begun. The operator then adjusts the pivotally mounted frame carrying the drum 17 to produce the desired depth of cut, by manipulating the winch. He then applies power from the drive shaft of the tractor through the driving means of the device to cause the drum 17 to revolve. It is to be noted (Fig. 7) that the direction of rotation of the drum 17 is such that the cutter bars 19 are caused to travel through the ground G being worked in the same direction as that of the travel of the tractor propelling my device and that the arcuate cutter heads 27 of the cutter bars 19 are projected in the direction of rotation of the drum 17, ejecting the excavated material G'' forwardly and upwardly upon the conveyor C which delivers it to the conveyor C' which ejects it under the tractor, throwing it clear on the side of the tractor opposite that on which my device is mounted. Since the excavated material G'' is removed by the operation of the conveyors C and C' from the ditch D produced by my device, it is obvious that the depth of the ditch D may be increased (as illustrated in Fig. 7) by repeating the travel of the device, as may be desired, the depth being limited only by the relation of the conveyor C' to the ground G.

Having described my invention, what I claim is:

1. In a ground working device, the combination of a frame; a plurality of brackets on said frame, each having a hollow trunnion; a shaft journaled in said trunnions; a collar loosely about each trunnion; an arm on each collar; a second shaft journaled in said arms; a rotary cutter member on said second shaft; means adapted to rotate said first shaft; and means adapted to drive said second shaft by rotation of said first shaft.

2. In a ground working device adapted to be used alternatively for plowing and for ditching, the combination of a pair of relatively adjustable arms, each having a journal for a shaft and adapted to be adjusted to carry in said journals a short shaft on which is mounted a single drum with cutter elements for ditching, and a long shaft on which is mounted a pair of drums with cutter elements for plowing; and means adapted so to rotate the short shaft that the single drum will cause the cutter elements to move against the ground in the direction of travel of the device, and so to rotate the long shaft that the pair of drums will cause the cutter elements to move against the ground in a direction opposite to the direction of travel of the device.

3. In a ground working device adapted to be used alternatively for plowing and for ditching, the combination of a frame; an arm pivotally mounted on said frame; a second arm having a bracket on which the second arm is pivotally mounted, the bracket being mountable on said frame in any one of a plurality of positions; a shaft journaled in said arms; a drum mounted on said shaft and provided with cutter elements for ditching; a second drum provided with cutter elements and adapted to be mounted on said shaft to co-act with said first drum for plowing; and means adapted to cause said shaft to rotate the single drum in one direction, and the two drums in the opposite direction.

4. In a ground working device, the combination of a frame; a bracket mounted on said frame; an arm pivotally mounted on said bracket; a second bracket so mounted on said frame as to be adjustable relative to said first bracket; a second arm pivotally mounted on said second bracket; a shaft journaled in said brackets; a second shaft journaled on said arms; means adapted to rotate said first shaft; means adapted to drive said second shaft by the rotation of said first shaft; and a rotary cutter member on said second shaft.

5. In a ground working device, the combination of a frame; an arm pivotally mounted on said frame; a bracket mountable on said frame in any one of a plurality of positions; a second arm pivotally mounted on said bracket; a shaft journaled on said frame; a second shaft journaled on said arms; means adapted to rotate said first shaft; means adapted to drive said second shaft by the rotation of said first shaft; and a rotary cutter member on said second shaft.

ROLLAND A. NORTON.